Feb. 6, 1962  M. LEWINSTEIN  3,020,477
POWER SPECTRUM ANALYZER
Filed Oct. 6, 1958
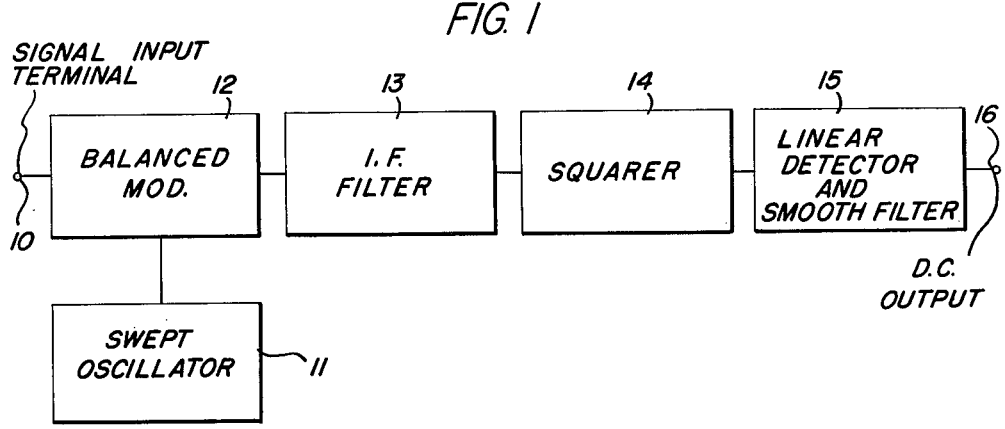
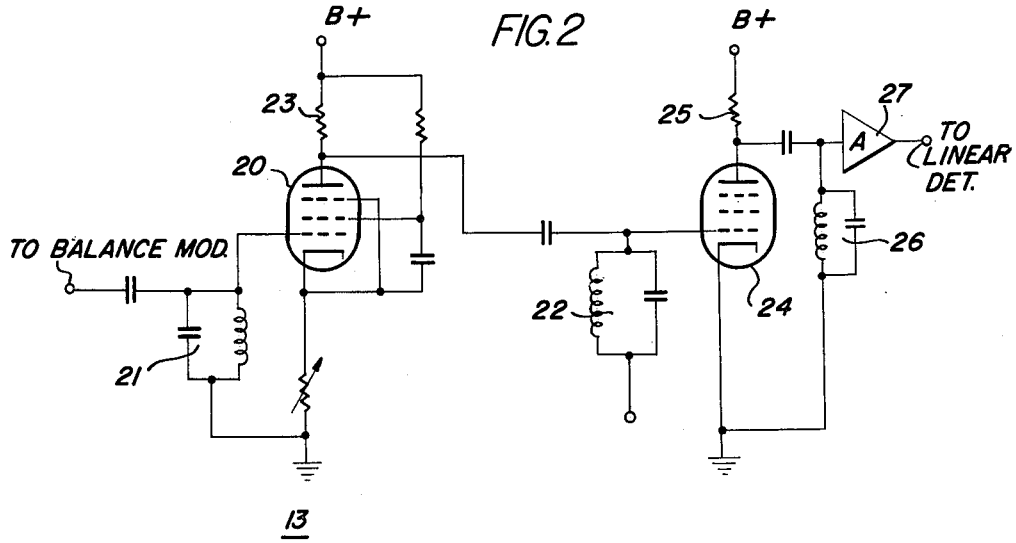
INVENTOR
MARCUS LEWINSTEIN
BY *Hurwitz & Rose*
ATTORNEYS

3,020,477
POWER SPECTRUM ANALYZER

Marcus Lewinstein, Jamaica, N.Y., assignor, by mesne assignments, to Electro-Mechanical Research, Inc., Sarasota, Fla., a corporation of Connecticut
Filed Oct. 6, 1958, Ser. No. 765,400
5 Claims. (Cl. 324—77)

The present invention relates generally to a system of spectrum analysis, and more particularly to a power spectrum analyzer of the frequency scanning type which employs an accurate squaring circuit for computing the power output of the analyzer.

Power spectrum analyzers of the frequency scanning superheterodyne type are known. They have heretofore employed square law detectors at the output of the I.F. filter, so that the output of the system may represent power. It has been found that square law detectors are unsatisfactory devices, in practice, for determining accurately the square of a quantity which may have an extremely wise range of amplitudes. Moreover, such detectors are temperature dependent and for that reason undesirable.

In accordance with the present invention, squaring in scanning power spectrum analyzers of the superheterodyne type is done at the output of the I.F. channel, prior of detection, and by means of a simple computer. Thereby a linear detector may be employed to detect computer output, and accurate measurements of power obtained.

The squarer employed operates on the following principle.

If we assume an input voltage $$V = X \sin wt \tag{1}$$

is applied to a non-linear circuit, the relation of current flow to applied voltage may be expressed as $$I = A + BV + CV^2 + DV \ldots \tag{2}$$

or, $$I = A + BX \sin wt + CX^2 \sin^2 wt \ldots \tag{3}$$

The third term of Equation 3 may be expanded as $$CX^2 \sin^2 wt = \frac{CX^2}{2} - \frac{CX^2}{2} \cos 2wt \tag{4}$$

Accordingly, there is present a component of current having twice the frequency of $w$ and an amplitude proportional to the square of the input voltage. The latter component of current is employed in the practice of the present invention, the computer employed for squaring being, accordingly, a simple, tuned frequency-multiplier, having a multiplication factor of two (2) and responsive to I.F. frequency.

It is, accordingly, a broad object of the invention to provide a novel system of power spectrum analysis.

It is another object of the invention to provide a power spectrum analyzer of the scanning superheterodyne type which employs a linear output detector, squaring being accomplished intermediate the I.F. amplifier and the detector of the system by operating on the I.F. signal.

The above and still further objects, features and advantages of the present invention will become apparent upon consideration of the following detailed description of one specific embodiment thereof, especially when taken in conjunction with the accompanying drawings, wherein:

FIGURE 1 is a block diagram of a system according to the invention; and

FIGURE 2 is a schematic circuit diagram of elements of the system of FIGURE 1.

Referring now to the accompanying drawings, the reference numeral 10 denotes an input terminal for signal to be analyzed. This signal may be assumed to lie in the audio band, in a preferred embodiment of the invention.

The terminal 10, as well as a swept oscillator 11, are connected in heterodyne relation to a balanced modulator 12. One component of the output of the latter, consisting of a single side band, is selected by an I.F. filter, 13, having a center frequency of 20 kc., for example. The output of the latter is supplied to a squarer circuit 14, and the output of the latter is linearly detected and smoothed in a linear detector and filter 15, to provide a varying D.C. output representing power, at output terminal 16.

The I.F. filter 13 of FIGURE 1 is illustrated schematically in FIGURE 2 of the accompanying drawings. The filter 13 employs a plate loaded pentode amplifier tube 20, having an input circuit 21 tuned to the I.F. frequency (20 kc.) as well as a further circuit 22 tuned to the same frequency and coupled to output load resistor 23. In general, the amplifier 13 is conventional, but use of both a tuned input and output circuit has been found to provide improved selectivity and freedom from low and high frequency skirt responses.

It is particularly important in this respect to avoid passing second harmonics of the band-pass center frequency, since these would find response in the succeeding circuitry.

The filter 22 supplies signal to a further plate loaded amplifier tube 24, to the plate resistance load 25 of which is coupled a tuned output circuit 26, having a center frequency of twice the I.F. frequency (40 kc.), and, of sufficiently high Q to reject the I.F. frequency (20 kc.). The tuned circuit 26 is coupled via an isolating amplifier 27 to linear detector 15.

The amplifier 27 primarily serves to avoid loading of the tuned circuit 26 by the detector 15.

The system of the invention has been found to have a minimum accuracy of 2% in linear-to-square-law conversion over a dynamic range of 40 db, i.e., the maximum error encountered is 2% over the stated range of amplitudes of input.

While I have described and illustrated one specific embodiment of my invention, it will be clear that variations of the general arrangement and of the details of construction which are specifically illustrated may be resorted to without departing from the true spirit and scope of the invention as defined in the appended claims.

What I claim is:

1. A spectrum analyzer of the frequency scanning superheterodyne type for analyzing a band of frequencies, comprising a modulator having a signal input circuit for said band of frequencies and an output circuit, a source of frequency scanning local oscillation signal coupled to said modulator, an intermediate frequency filter coupled to said modulator output circuit, said intermediate frequency filter being tuned to the difference frequency between the scanning local oscillator frequency and the frequencies of the band of frequency, a frequency doubler coupled in cascade with said intermediate frequency filter, and a linear detector coupled in cascade with said frequency doubler, said frequency doubler including a bandpass tuned circuit tuned to twice the center frequency of said intermediate frequency filter and having a Q sufficiently high to reject frequencies passed by said intermediate frequency filter.

2. A spectrum analyzer of the frequency scanning superheterodyne type, including a modulator, a source of signal to be analyzed, a source of frequency scanning local oscillator signal, means for coupling said sources to said modulator in heterodyne relation, means including a narrow band-pass filter for deriving a heterodyne product from said modulator, an analog squarer circuit in cascade with said band-pass filter, and a linear detector in cascade with said analog squarer circuit, said squarer circuit being a frequency multiplier.

3. The combination according to claim 2 wherein said frequency multiplier has a multiplication factor of two.

4. The combination according to claim 2 wherein said squarer circuit includes an amplifier device coupled in cascade with said band-pass filter, said amplifier device including a band-pass filter and having a Q sufficiently high to reject frequencies passed by said band-pass filter.

5. The combination according to claim 4 wherein said band-pass filter is an amplifying filter having a tuned input circuit and a tuned output circuit.

References Cited in the file of this patent

UNITED STATES PATENTS

| | | |
|---|---|---|
| 2,159,790 | Freystedt | May 23, 1939 |
| 2,425,003 | Potter | Aug. 5, 1947 |
| 2,428,180 | Scherbatskoy | Sept. 30, 1947 |
| 2,578,348 | Gannett | Dec. 11, 1951 |
| 2,597,358 | McCouch et al. | May 20, 1952 |
| 2,763,837 | Follingstad | Sept. 18, 1956 |
| 2,791,747 | Rosenthal et al. | May 1, 1957 |
| 2,840,701 | Hurvitz | June 24, 1958 |
| 2,883,616 | Sabaroff | Apr. 21, 1959 |

FOREIGN PATENTS

| | | |
|---|---|---|
| 618,562 | Great Britain | Feb. 23, 1949 |

OTHER REFERENCES

"On Filter Problems of the Power Spectrum Analyzer," Proceedings of the I.R.E., August 1954, pp. 1278–1282.

Engineering Electronics, by Happell & Hesselberth, pub. by McGraw-Hill Book Co. Inc., 1953.